US 8,941,560 B2

(12) United States Patent
Wong et al.

(10) Patent No.: US 8,941,560 B2
(45) Date of Patent: Jan. 27, 2015

(54) WEARABLE COMPUTER WITH SUPERIMPOSED CONTROLS AND INSTRUCTIONS FOR EXTERNAL DEVICE

(75) Inventors: Adrian Wong, Mountain View, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 471 days.

(21) Appl. No.: 13/238,557

(22) Filed: Sep. 21, 2011

(65) Prior Publication Data

US 2013/0069985 A1    Mar. 21, 2013

(51) Int. Cl.
*G09G 5/00* (2006.01)
*G06F 1/16* (2006.01)
*G02B 27/01* (2006.01)
*G06F 3/01* (2006.01)
*G06F 3/14* (2006.01)

(52) U.S. Cl.
CPC .............. *G06F 1/163* (2013.01); *G02B 27/017* (2013.01); *G02B 27/0189* (2013.01); *G06F 3/011* (2013.01); *G06F 3/017* (2013.01); *G06F 3/14* (2013.01); *G02B 2027/0138* (2013.01); *G02B 2027/014* (2013.01)
USPC .................................. 345/8; 345/7

(58) Field of Classification Search
CPC .............. G02B 27/017; G02B 27/0178; G02B 27/0138; G06F 3/011; G06F 3/017; G06F 1/163; G06F 3/04886; G06F 1/3218; G06F 3/014; G06F 3/0425
USPC ........................................ 345/7, 8
See application file for complete search history.

(56) References Cited

U.S. PATENT DOCUMENTS

| | | |
|---|---|---|
| 5,526,184 A | 6/1996 | Tokuhashi et al. |
| 5,715,337 A | 2/1998 | Spitzer et al. |
| 5,886,822 A | 3/1999 | Spitzer |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,201,629 B1 | 3/2001 | McClelland et al. |
| 6,204,974 B1 | 3/2001 | Spitzer |

(Continued)

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Lixi C Simpson
(74) *Attorney, Agent, or Firm* — McDonnell Boehnen Hulbert & Berghoff LLP

(57) ABSTRACT

A wearable computing device includes a head-mounted display (HMD) that provides a field of view in which at least a portion of the environment of the wearable computing device is viewable. The HMD is operable to display images superimposed over the field of view. When the wearable computing device determines that a target device is within its environment, the wearable computing device obtains target device information related to the target device. The target device information may include information that defines a virtual control interface for controlling the target device and an identification of a defined area of the target device on which the virtual control image is to be provided. The wearable computing device controls the HMD to display the virtual control image as an image superimposed over the defined area of the target device in the field of view.

35 Claims, 12 Drawing Sheets

(56) References Cited

U.S. PATENT DOCUMENTS

| | | | |
|---|---|---|---|
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,574,672 B1 | 6/2003 | Mitchell et al. |
| 6,618,099 B1 | 9/2003 | Spitzer |
| 6,693,749 B2 | 2/2004 | King et al. |
| 6,701,038 B2 | 3/2004 | Rensing et al. |
| 6,724,354 B1 | 4/2004 | Spitzer |
| 6,879,443 B2 | 4/2005 | Spitzer et al. |
| 7,126,558 B1 | 10/2006 | Dempski |
| 7,158,096 B1 | 1/2007 | Spitzer |
| 7,192,136 B2 | 3/2007 | Howell et al. |
| 7,242,527 B2 | 7/2007 | Spitzer et al. |
| 7,255,437 B2 | 8/2007 | Howell et al. |
| 7,380,936 B2 | 6/2008 | Howell et al. |
| 7,401,918 B2 | 7/2008 | Howell et al. |
| 7,438,410 B1 | 10/2008 | Howell et al. |
| 7,457,040 B2 | 11/2008 | Amitai |
| 7,481,531 B2 | 1/2009 | Howell et al. |
| 7,500,746 B1 | 3/2009 | Howell et al. |
| 7,500,747 B2 | 3/2009 | Howell et al. |
| 7,543,934 B2 | 6/2009 | Howell et al. |
| 7,581,833 B2 | 9/2009 | Howell et al. |
| 7,621,634 B2 | 11/2009 | Howell et al. |
| 7,663,805 B2 | 2/2010 | Zaloum et al. |
| 7,672,055 B2 | 3/2010 | Amitai |
| 7,677,723 B2 | 3/2010 | Howell et al. |
| 7,724,443 B2 | 5/2010 | Amitari |
| 7,751,122 B2 | 7/2010 | Amitai |
| 7,760,898 B2 | 7/2010 | Howell et al. |
| 7,771,046 B2 | 8/2010 | Howell et al. |
| 7,792,552 B2 | 9/2010 | Thomas et al. |
| 7,806,525 B2 | 10/2010 | Howell et al. |
| 7,843,403 B2 | 11/2010 | Spitzer |
| 7,900,068 B2 | 3/2011 | Weststrate et al. |
| 7,922,321 B2 | 4/2011 | Howell et al. |
| 8,004,765 B2 | 8/2011 | Amitai |
| 8,109,629 B2 | 2/2012 | Howell et al. |
| 2003/0090439 A1 | 5/2003 | Spitzer et al. |
| 2005/0174651 A1 | 8/2005 | Spitzer et al. |
| 2006/0028400 A1 | 2/2006 | Lapstun et al. |
| 2006/0192306 A1 | 8/2006 | Giller et al. |
| 2006/0192307 A1 | 8/2006 | Giller et al. |
| 2007/0052672 A1* | 3/2007 | Ritter et al. .................. 345/156 |
| 2007/0262965 A1 | 11/2007 | Hirai et al. |
| 2008/0219025 A1 | 9/2008 | Spitzer et al. |
| 2009/0122414 A1 | 5/2009 | Amitai |
| 2009/0300535 A1 | 12/2009 | Skourup et al. |
| 2010/0001928 A1* | 1/2010 | Nutaro .............................. 345/8 |
| 2010/0046070 A1 | 2/2010 | Mukawa |
| 2010/0103075 A1* | 4/2010 | Kalaboukis et al. ............. 345/8 |
| 2010/0103078 A1 | 4/2010 | Mukawa et al. |
| 2010/0103104 A1 | 4/2010 | Son et al. |
| 2010/0110368 A1 | 5/2010 | Chaum |
| 2010/0149073 A1 | 6/2010 | Chaum et al. |
| 2010/0278480 A1 | 11/2010 | Vasylyev et al. |
| 2010/0315329 A1 | 12/2010 | Previc et al. |
| 2011/0022033 A1 | 1/2011 | Guzman |
| 2011/0221656 A1 | 9/2011 | Haddick et al. |
| 2011/0227820 A1 | 9/2011 | Haddick et al. |
| 2012/0075168 A1* | 3/2012 | Osterhout et al. ................. 345/8 |
| 2012/0092300 A1* | 4/2012 | Wang et al. .................... 345/175 |
| 2012/0115543 A1 | 5/2012 | Lin |
| 2012/0249741 A1 | 10/2012 | Maciocci et al. |
| 2012/0320169 A1* | 12/2012 | Bathiche ......................... 348/53 |
| 2013/0016033 A1* | 1/2013 | Latta et al. ........................ 345/8 |
| 2013/0050258 A1* | 2/2013 | Liu et al. ....................... 345/633 |
| 2013/0300636 A1* | 11/2013 | Cunningham et al. ............ 345/8 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Cakmakci, Ozan et al., "Head-Worn Displays: A Review," Journal of Display Technology, vol. 2, pp. 199-216, 2006.

BMW, "Augmented Reality" video, downloaded from http://www.bmw.com/com/en/owners/service/augmented_reality_introduction_1.html on Aug. 6, 2011.

PCT Search Report and Written Opinion, PCT International Application No. PCT/US2012/051594 dated Feb. 27, 2013.

\* cited by examiner

WEARABLE COMPUTER WITH SUPERIMPOSED CONTROLS AND INSTRUCTIONS FOR EXTERNAL DEVICE

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, a method is provided. The method includes determining that a target device is within an environment of a wearable computing device. The wearable computing device includes a head-mounted display (HMD) that provides a field of view in which at least a portion of the environment is viewable. In addition, the HMD is operable to display images superimposed over the field of view. The method further includes obtaining target device information related to the target device. The target device information defines a virtual control interface for controlling the target device and identifies a defined area of the target device on which the virtual control interface is to be provided. The method further includes controlling the HMD to display the virtual control interface as an image superimposed over the defined area of the target device in the field of view.

In a second aspect, a non-transitory computer readable medium is provided. The non-transitory computer readable medium has stored instructions that are executable by a computing device to cause the computing device to perform functions. The functions include: (a) determining that a target device is within a field of view provided by a see-through display controlled by the computing device; (b) obtaining target device information related to the target device, wherein the target device information defines a virtual control interface for controlling the target device and identifies a defined area of the target device on which the virtual control interface is to be provided; and (c) controlling the see-through display to display the virtual control interface as an image superimposed over the defined area of the target device in the field of view.

In a third aspect, a wearable computing device is provided. The wearable computing device includes a head-mounted display (HMD) and a controller. The HMD is configured to provide a field of view in which at least a portion of an environment of the wearable computing device is viewable. In addition, the HMD is operable to display images superimposed over the field of view. The controller is configured to: (a) determine that a target device is within the environment of the wearable computing device; (b) obtain target device information related to the target device, wherein the target device information defines a virtual control interface for controlling the target device and identifies a defined area of the target device on which the virtual control interface is to be provide; and (c) control the HMD to display the virtual control interface as an image superimposed over the defined area of the target device in the field of view.

DETAILED DESCRIPTION

Figure 1:
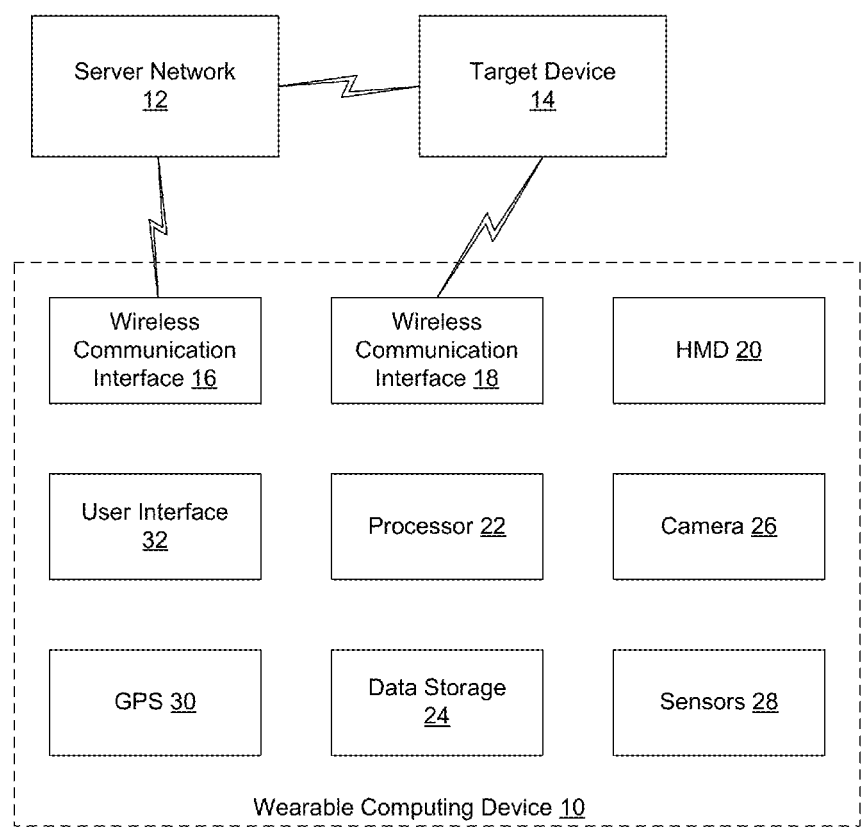
FIG. 1 is functional block diagram of a wearable computing device in communication with a server network and a target device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A wearable computing device may facilitate the wearer's operation of or understanding of a particular device, described herein as a "target device," that is located in the wearer's environment. The target device could be any electrical, optical, or mechanical device. For example, the target device could be a home appliance, such as a refrigerator, espresso maker, television, garage door, alarm system, indoor or outdoor lighting system, or an office appliance, such as a copy machine. The target device may have an existing user interface that may include, for example, buttons, a touch screen, a keypad, or other controls through which the target device may receive control instructions or other input from a user. The target device's existing user interface may also include a display, indicator lights, a speaker, or other elements through which the target device may convey operating instructions, status information, or other output to the user. Alternatively, the target device may have no outwardly visible user interface. As described herein, a wearable computing device may provide the wearer with additional means by which the wearer can control the target device, provide input to the target device, receive instructions for operating the target device, receive status information regarding the target device, and/or receive other information related to the target device.

In one example, the wearable computing device includes a head-mounted display (HMD) that enables its wearer to observe the wearer's real-world surroundings and also view a displayed image, such as a computer-generated image. In some cases, the displayed image may overlay a portion of the wearer's field of view of the real world. Thus, while the wearer of the HMD is going about his or her daily activities, such as working, walking, driving, exercising, etc., the wearer may be able to see a displayed image generated by the HMD at the same time that the wearer is looking out at his or her real-world surroundings.

The displayed image might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. Thus, the images displayed by the HMD could include menus, selection boxes, navigation icons, or other user interface features that enable the wearer to invoke functions of the wearable computing device or otherwise interact with the wearable computing device.

The HMD may include an optical system that is mounted to a head-mounted support. The optical system may be operable to present virtual images overlaid upon a real-world view to a wearer. To display a virtual image to the wearer, the optical system may include a light source, such as a light-emitting diode (LED), that is configured to illuminate a display panel, such as a liquid crystal-on-silicon (LCOS) display panel. The display panel generates light patterns by spatially modulating the light from the light source, and an image former forms a virtual image from the light pattern. Furthermore, the HMD may include a camera configured to capture images that may be similar to the wearer's field of view. The camera may be integrated into the optical system or could be mounted on, or integrated into, the head-mounted support.

The wearable computing device may control the HMD to provide an "augmented reality" experience to the wearer that facilitates the wearer's interaction with target devices. In one example, the wearable computing device detects and identifies one or more target devices that are within the wearer's environment. The wearable computing device may detect and/or identify a target device in various ways. As one example, the wearable computing device may recognize a target device by analyzing a video or one or more still images corresponding to the wearer's point-of-view. As another example, the wearable computing device may detect a beacon or other signal transmitted by the target device. The beacon or other signal could be, for example, a radio frequency signal, e.g., using WiFi, Bluetooth, or near field communication (NFC), an optical signal, such as an optical signal emitted by a visible or infrared LED on the target device, or an acoustic signal, such as an ultrasonic signal. In other examples, the wearable computing device may detect a radio frequency identification (RFID) tag on the target device or recognize an optical identification, such as a barcode or quick response (QR) code on the target device. In still other examples, the wearable computing device may determine that the location of the wearable computing device is near the known location of a target device. It is to be understood that these methods are exemplary only, as a wearable computing device may use other methods to detect and/or identify a target device in the wearer's environment. It is also to be understood that the wearable computing device may use a combination of methods to detect and/or identify a target device in the wearer's environment.

Once the target device is identified, the wearable computing device may control the HMD to display one or more images that may facilitate the wearer's interaction with and/or understanding of the target device. For example, the wearable computing device may determine that a virtual control interface is associated with the target device and then control the HMD to display the virtual control interface as an image superimposed over a defined area on the surface of the device. Thus, the virtual control interface may appear to be affixed to the target device, i.e., it stays anchored on the target device as the wearer moves. Alternatively, the HMD may display the virtual control interface so that it remains within the wearer's field of view, rather than affixed to the target device. For example, the virtual control interface may be "head-fixed" so that it remains visible to the wearer as the wearer moves his or head (e.g., to the left or the right) regardless of whether the wearer is looking at the target device. Thus, the HMD might display a virtual control interface for a target device that is not currently within the wearer's field of view.

To provide a virtual control interface that appears affixed to a defined area of the a target device, the wearable computing device may determine the appearance of the defined area from the perspective of the wearer's field of view and adjust the shape, size, and orientation of the image so that it corresponds to the perspective appearance of the defined area. The wearable computing device may also determine the distance to the defined area of the target device and adjust the apparent distance of the virtual control interface to match the distance to the defined area. As such, the virtual control interface may appear to the wearer as if it is on the surface of the target device in the defined area.

The virtual control interface may be displayed on the target device so as to assist the wearer in accomplishing certain tasks. For example, an indication to insert paper in a copy machine may be superimposed at the location where the paper should be inserted. As another example, graphical step-by-step instructions that assist a wearer in clearing a paper jam may be presented overlaid upon or near the physical parts of the copy machine (as viewable by the wearer) that need to be manipulated by the wearer in order to clear the paper jam. Thus, the wearable computing device may present to a wearer virtual images with content and placement location that may vary dynamically due to the environment or task context.

Further, the wearable computing device may allow for control of the target device via interactive gestures with the virtual control interface. For example, the virtual control interface displayed by the HMD may include one or more user interface elements, such as virtual buttons, that allow the wearer to control the target device. The virtual buttons could appear to be on the surface to the target device, or they could appear in a way that is not physically connected to the target device (e.g., in a "head-fixed" virtual control interface).

The wearable computing may recognize movement of the wearer's fingers towards a virtual button as a control instruction for the target device. As one example, a virtual control interface for controlling a refrigerator (such as adjusting a temperature set-point) may be superimposed upon the refrigerator surface. In order to control the target device, the wearer may attempt to touch the virtual control interface at the apparent distance of the virtual control interface. For example, the wearer may touch a location on the refrigerator where a virtual button in the virtual control interface appears. The wearable computing device may recognize this touching motion as a control instruction and transmit the control instruction to the target device.

The wearable computing device may further recognize the wearer's motions with respect to a virtual control interface located at an arbitrary position. For instance, the wearable computing device may recognize non-contact gestures towards the apparent position of the virtual control interface as control instructions for the target device. Furthermore, the wearable computing device may recognize inputs received through a user interface as control instructions for the target device. Such input may include, for example, a touch interaction with a touchpad, actuation of one or more buttons or keys on a keypad, or voice commands.

The wearable computing device may also transmit control instructions for a target device automatically. For example, the wearable computing device may be configured to transmit a control instruction to a target device based on predefined criteria, such as proximity to the target device. For example, a wearable computing device may be configured to automatically turn on outdoor lights at the wearer's residence whenever it is dark and the wearer is approaching the residence from outside. As another example, a wearable computing device may be configured to open a garage door at the wearer's residence whenever the wearer is approaching the garage door from the driveway while in a vehicle and may be configured to close the garage door whenever the wearer leaves through the garage.

A wearable computing device may also be able to record a sequence of control instructions for performing a certain task at a target device (such as making stapled and collated copies at a copy machine) so that the wearable computing device can play back the control instructions at the instance of the wearer. Thus, the wearer may be able to create a "macro" in which one instruction from the wearer may cause the wearable computing device to transmit a desired sequence of control instructions for a target device.

The wearable computing device may be communicatively coupled to a server network with wireless communication means. Furthermore, the wearable computing device may communicate with the server network in order to achieve enhanced functionality during interactions with a target device. For instance, the wearable computing device may send to the server network one or more point-of-view images from a camera mounted on the HMD. The server network may then use an image recognition algorithm to identify a target device in the one or more point-view images. The server network may then transmit information regarding the target device, such as information regarding a virtual control interface for controlling the target device, to the wearable computing device.

2. Example Wearable Computing Devices

FIG. 1 is a functional block diagram of a wearable computing device 10 that is able to communicate with a server network 12 and a target device 14. The server network 12 is a network of one or more servers and may include one or more databases or other components. The target device 14 could be any device that may be controlled, either directly or indirectly, by the wearer of wearable computing device 10. For example, target device 14 could be a household appliance or device, such as a refrigerator, television, dishwasher, audio system, video system, alarm system, thermostat, garage door, etc. Alternatively, target device 14 could be an office appliance or device, such as a copy machine, fax machine, projection system, security system, etc. Other examples of target device 14 are also possible.

In one example, wearable computing device includes a wireless communication interface 16 for wirelessly communicating with server network 12 and a wireless communication interface 18 for wirelessly communicating with target device 14. Wireless communication interface 16 could use any form of wireless communication that can support bi-directional data exchange over a packet network (such as the internet). For example, wireless communication interface 16 could use 3G cellular communication, such as CDMA, EVDO, GSM/GPRS, or 4G cellular communication, such as WiMAX or LTE. Alternatively, wireless communication interface 16 could communicate with server network 12 via a wireless local area network (WLAN), for example, using WiFi.

Wireless communication interface 18 may be configured to communicate with target device 14 directly, for example, using an infrared link, Bluetooth, or ZigBee. Alternatively, wireless communication interface 18 may be configured to communicate with target device 14 indirectly, such as through a WLAN using WiFi. The wireless communications could be uni-directional, for example, with wearable computing device 10 transmitting one or more control instructions for target device 14. Alternatively, the wireless communications could be bi-directional, so that target device 14 may communicate status information in addition to receiving control instructions.

Although FIG. 1 illustrates an example in which the wearable computing device 10 includes two wireless communication interfaces, it is to be understood that wearable computing device 10 could include one wireless communication interface that is able to communicate with both server network 12 and target device 14. For example, wearable computing device 10 may be able to use WiFi, or other form of wireless communication, to access a WLAN that supports communication with both server network 12 and target device 14. Alternatively, wearable computing device 10 may communicate with target device 14 via server network 12. For example, wearable computing device 10 may send a communication to server network 12, which server network 12 then forwards to target device 14.

Wearable computing device 10 also includes a head-mounted display (HMD) 20. In an exemplary embodiment, HMD 20 includes a see-through display. Thus, the wearer of wearable computing device 10 may be able to look through HMD 20 and observe a portion of the real-world environment of the wearable computing device 10, i.e., in a particular field of view provided by HMD 20. In addition, HMD 20 is operable to display images that are superimposed on the field of view, for example, to provide an "augmented reality" experience. Some of the images displayed by HMD 20 may be superimposed over particular objects in the field of view, such as target device 14. However, HMD 20 may also display images that appear to hover within the field of view instead of being associated with particular objects in the field of view.

HMD 20 could be configured as, for example, eyeglasses, goggles, a helmet, a hat, a visor, a headband, or in some other form that can be supported on or from the wearer's head. Further, HMD 20 may be configured to display images to both of the wearer's eyes, for example, using two see-through displays. Alternatively, HMD 20 may include only a single see-through display and may display images to only one of the wearer's eyes, either the left eye or the right eye.

The functioning of wearable computing device 10 may be controlled by a processor 22 that executes instructions stored in a non-transitory computer readable medium, such as data storage 24. Thus, processor 22 in combination with instructions stored in data storage 24 may function as a controller of wearable computing device 10. As such, processor 22 may control HMD 20 in order to control what images are displayed by HMD 20. Processor 22 may also control wireless communication interface 16 (e.g., in order to communicate with server network 14) and wireless communication interface 18 (e.g., in order to transmit control instructions to target device 14).

In addition to instructions that may be executed by processor 22, data storage 24 may store data that may facilitate interactions with target devices, such as target device 14. For example, data storage 24 may function as a database of information related to target devices. Such information may be used by wearable computing device 10 to identify target devices that are detected to be within the environment of wearable computing device 10 and to define what images are to be displayed by HMD 20 when target devices are identified.

In one example, the information related to a target device defines a virtual control interface that is to be displayed on the surface of the target device in a defined area. The virtual control interface may be defined in terms of its visual elements, which could appear as virtual buttons, switches, scroll bars, keys, or any other known elements for receiving input from a user. The virtual control interface may also be defined in terms of one or more control instructions for controlling the target device. For example, a particular visual element of a virtual control interface, such as a virtual button, may be associated with a particular control instruction, so that actuation of the virtual button may result in its associated control instruction being sent to the target device.

The information for a target device may also define other images that may be displayed, such as instructions for operating the target device. Thus, once processor 22 has identified a target device, processor may retrieve information related to the target device from data storage 24 and may control HMD 20 to display images defined by the target device information. Alternatively, instead of retrieving target device information from data storage 24, processor may obtain target device information by communicating with server network 12, for example, via wireless communication interface 16.

Wearable computing device 10 may also include a camera 26 that is configured to capture images of the environment of wearable computing device 10 from a particular point-of-view. The images could be either video images or still images. The point-of-view of camera 26 may correspond to the direction where HMD 20 is facing. Thus, the point-of-view of camera 26 may substantially correspond to the field of view that HMD 20 provides to the wearer, such that the point-of-view images obtained by camera 26 may be used to determine what is visible to the wearer through HMD 20.

As described in more detail below, the point-of-view images obtained by camera 26 may be used to detect and identify target devices that are within the environment of wearable computing device 10. The image analysis could be performed by processor 22. Alternatively, processor 22 may transmit one or more point-of-view images obtained by camera 26 to server network 12, via wireless communication interface 16, for the image analysis. When server network 12 identifies a target device in a point-of-view image, server network 12 may respond with information related to the target device.

In addition to image analysis of point-of-view images obtained by camera 26, target devices, such as target device 14 could be detected and identified in other ways. In this regard, wearable computing device 10 may include one or more sensors 28 for detecting when a target device is within its environment. For example, sensors 28 may include a radio frequency identification (RFID) reader that can detect an RFID tag on a target device. Alternatively or additionally, sensors 28 may include a scanner that can scan an optical code, such as a bar code or QR code, on the target device. The optical code might be detectable in visible light. Alternatively, the optical code might be detectable using infrared radiation. Further, sensors 28 may be configured to detect a particular beacon signal transmitted by a target device. The beacon signal could be, for example, a radio frequency signal, an ultrasonic signal, or an optical signal (which could be transmitted by a visible or infrared LED on the target device). Sensors 28 may further include one or more motion sensors, such as accelerometers and/or gyroscopes.

A target device could also be determined to be within the environment of wearable computing device 10 based on the location of wearable computing device 10. For example, wearable computing device 10 may include a Global Position System (GPS) receiver 30 that is able to determine the location of wearable computing device 10. Wearable computing device 10 may then compare its location to the known locations of target devices (e.g., locations stored in data storage 24) to determine when a particular target device is in the vicinity. Alternatively, wearable computing device 10 may communicate its location to server network 12, via wireless communication interface 16, and server network 12 may respond with information relating to any target devices that are nearby.

Wearable computing device 10 may also include a user interface 32 for receiving input from the wearer. User interface 32 could include, for example, a touchpad, a keypad, buttons, a microphone, and/or other input devices. Processor 22 may control the functioning of wearable computing device 10 based on input received through user interface 32. For example, processor 22 may use the input to control how HMD 20 displays images or what images HMD 20 displays. Processor 22 may also recognize input received through user interface 32 as a control instruction for a target device, for example, in conjunction with a virtual control interface that HMD 20 is displaying for the target device.

Processor 22 may also recognize gestures as control instructions for a target device. Thus, while HMD 20 displays a virtual control interface for a target device, processor 22 may analyze still images or video images obtained by camera 26 to identify any gesture that corresponds to a control instruction associated with the virtual control interface. For example, if processor 22 recognizes a finger moving toward a location of the target device corresponding to where a virtual button appears in the virtual control interface, then processor 22 may recognize a control instruction associated with the virtual button. In some examples, a gesture corresponding to a control instruction may involve the wearer physically touching the target device, for example, using the wearer's finger, hand, or an object held in the wearer's hand. However, a gesture that does not involve physical contact with the target device, such as a movement of the wearer's finger, hand, or an object held in the wearer's hand, toward the target device or in the vicinity of the target device, could be recognized as a control instruction.

Although FIG. 1 shows various components of wearable computing device 10, i.e., wireless communication interfaces 16 and 18, processor 22, data storage 24, camera 26, sensors 28, GPS 30, and user interface 32, as being separate from HMD 20, one or more of these components could be mounted on or integrated into HMD 20. For example, camera 26 could be mounted on HMD 20, user interface 32 could be provided as a touchpad on HMD 20, processor 22 and data storage 24 could make up a computing system in HMD 20, and the other components of wearable computing device 10 could be similarly integrated into HMD 20. Alternatively, wearable computing device 10 could be provided in the form of separate devices that can be worn on or carried by the wearer. The separate devices that make up wearable computing device 10 could be communicatively coupled together in either a wired or wireless fashion.

Figure 2:
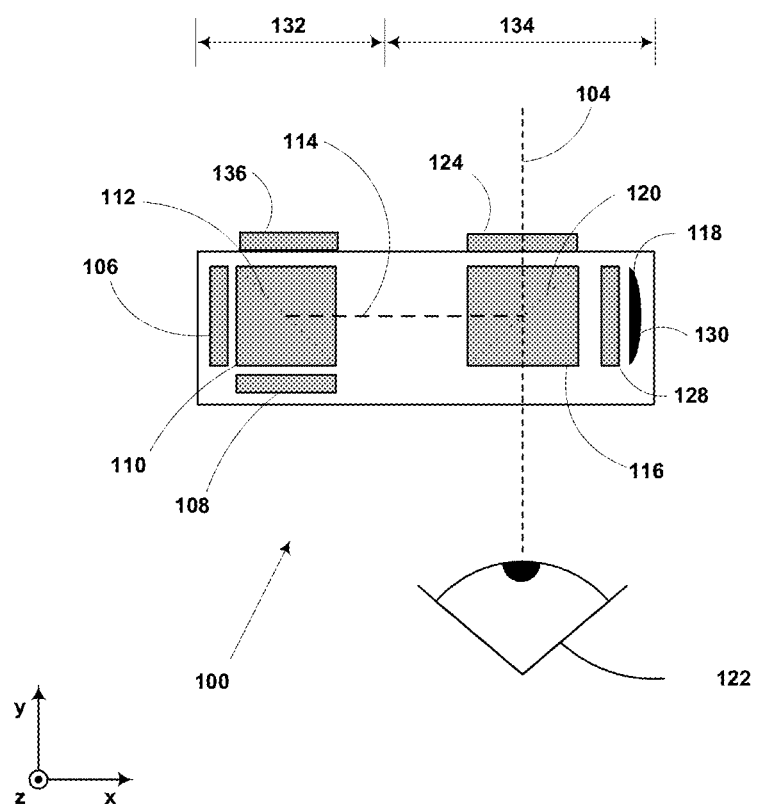
FIG. 2 is a top view of an optical system, in accordance with an example embodiment.

FIG. 2 illustrates a top view of an optical system 100 that can function as a see-through display (and may correspond to a see-through display in HMD 20). In particular, optical system 100 is configured to display a virtual image superimposed upon a real-world scene viewable along a viewing axis 104, for example, by an eye 122 of the wearer. For clarity, a distal portion 132 and a proximal portion 134 represent optically-coupled portions of the optical system 100 that may or may not be physically separated. In the example illustrated in FIG. 2, a distal beam splitter 110 is located in the distal portion 132 and a proximal beam splitter 116 is located in the proximal portion 134. The viewing axis 104 may extend through the proximal beam splitter 116.

The distal beam splitter 110 may be optically coupled to a display panel 106 and a light source 108. The display panel 106 may be illuminated by the light source 108 via the distal beam splitter 110. The light source 108 may include one or more light-emitting diodes (LEDs) and/or laser diodes. The light source 108 may further include a linear polarizer that acts to pass one particular polarization to the rest of the optical system. In an example embodiment, the distal beam splitter 110 is a polarizing beam splitter that reflects light depending upon the polarization of light incident upon the beam splitter. Thus, s-polarized light from the light source 108 may be preferentially reflected by a distal beam-splitting interface 112 towards the display panel 106. The display panel 106 in the example embodiment is a liquid crystal-on-silicon (LCOS) display, but could also be a digital light projector (DLP) micro-mirror display, or other type of reflective display panel. The display panel 106 acts to spatially-modulate the incident light to generate a light pattern. Alternatively, the display panel 106 may be an emissive-type display such as an organic light-emitting diode (OLED) display.

In the example in which the display panel 106 is a LCOS display panel, the display panel 106 generates a light pattern with a polarization perpendicular to the polarization of light initially incident upon the panel. In this example embodiment, the display panel 106 converts incident s-polarized light into a light pattern with p-polarization. The generated light pattern from the display panel 106 is directed towards the distal beam splitter 110. The p-polarized light pattern passes through the distal beam splitter 110 and is directed along an optical axis 114 towards the proximal region of the optical system 100. In an example embodiment, the proximal beam splitter 116 is also a polarizing beam splitter. The light pattern is at least partially transmitted through the proximal beam splitter 116 to the image former 118.

In an example embodiment, image former 118 includes a concave mirror 130 and a quarter-wave plate 128. The light pattern passes through the quarter-wave plate 128 and is reflected by the concave mirror 130. The reflected light pattern passes back through quarter-wave plate 128. Through the interactions with the quarter-wave plate 128 and the concave mirror 130, the light patterns are converted to the s-polarization and are formed into a virtual image. The proximal beam splitting interface 120 reflects the virtual image so that is viewable along viewing axis 104.

A real-world scene is also viewable along the viewing axis 104 through a viewing window 124. The viewing window 124 may include a linear polarizer in order to reduce stray light within the optical system. Light from the viewing window 124 is at least partially transmitted through the proximal beam splitter 116. Thus, both a virtual image and a real-world image are viewable to the viewer 122 through the proximal beam splitter 116.

Optical system 100 could also include a camera 136 that is configured to image the real-world scene that is viewable through viewing window 124. The camera 136 could, for example, be optically coupled to the distal beam splitter 110 as shown in FIG. 2. Thus, some of the light from outside entering through viewing window 124 may be reflected by proximal beam-splitting interface 120 toward distal beam splitter 110. Distal beam-splitting interface 112 may, in turn, reflect at least a portion of this outside light toward camera 136. In this way, camera 136 may be configured to image the same field of view of the outside world that is viewable by viewer 122 along viewing axis 104.

Although FIG. 2 depicts the distal portion 132 of the optical system housing as to the left of the proximal portion 134 of the optical system housing when viewed from above, it is understood that other embodiments are possible to physically realize the optical system 100, including the distal portion 132 being configured to be to the right, below and above with respect to the proximal portion 134.

Figure 3A:
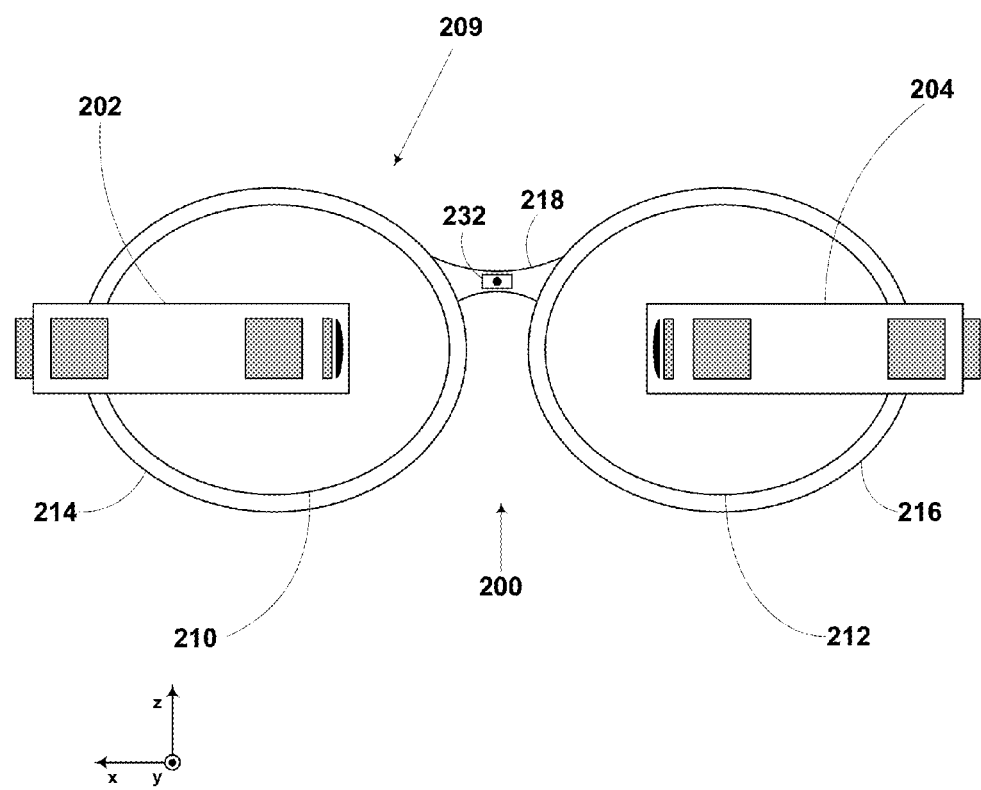
FIG. 3A is a front view of a head-mounted display, in accordance with an example embodiment.
Figure 3B:
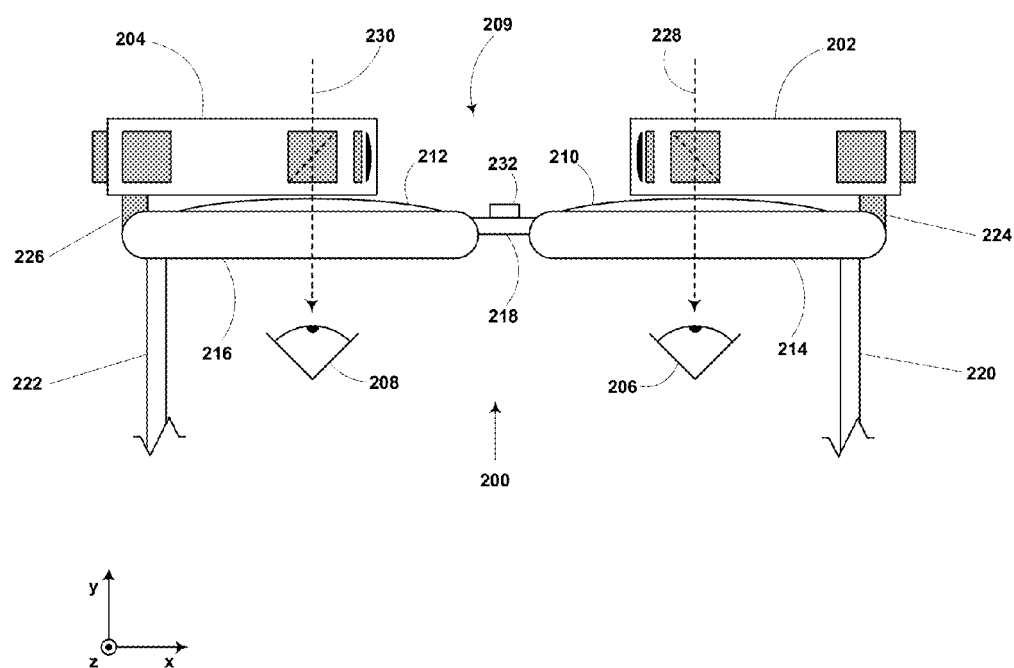
FIG. 3B is a top view of the head-mounted display of FIG. 3A, in accordance with an example embodiment.
Figure 3C:
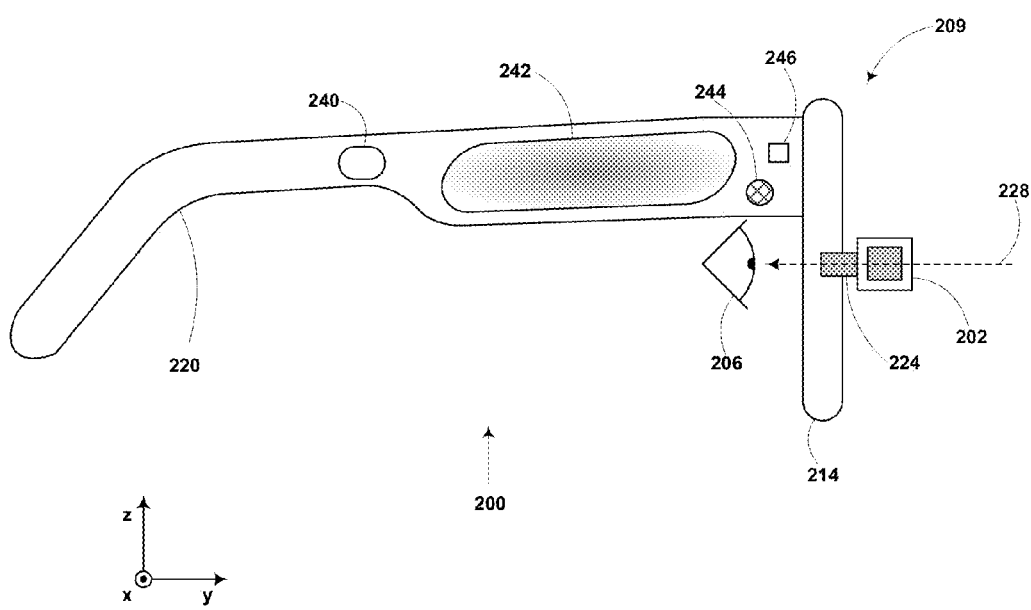
FIG. 3C is a side view of the head-mounted display of FIG. 3A and FIG. 3B, in accordance with an example embodiment.

FIGS. 3A, 3B, and 3C illustrate an HMD 200 that is configured in the form of eyeglasses and includes two see-through displays that could be of the type shown in FIG. 2. FIG. 3A is a front view of HMD 200 with see-through displays 202 and 204 mounted on a head-mounted support 209. FIGS. 3B and 3C show top and side views, respectively, of HMD 200. Although the HMD is in the form of eyeglasses in this example, it will be understood that HMDs may take other forms, such as hats, goggles, visors, headbands, or helmets.

The head-mounted support 209 includes lens frames 214 and 216, a center frame support 218, lens elements 210 and 212, and extending side-arms 220 and 222. The center frame support 218 and side-arms 220 and 222 are configured to secure the head-mounted support 209 to the wearer's head via the wearer's nose and ears, respectively. Each of the frame elements 214, 216, and 218 and the extending side-arms 220 and 222 may be formed of a solid structure of plastic or metal, or may be formed of a hollow structure of similar material so as to allow wiring and component interconnects to be internally routed through the head-mounted support 209. Alternatively or additionally, head-mounted support 209 may support external wiring. Lens elements 210 and 212 are at least partially transparent so as to allow the wearer to look through them. In particular, the wearer's left eye 208 may look through left lens 212 and the wearer's right eye 206 may look through right lens 210. See-through displays 202 and 204, which may be configured as shown in FIG. 1, may be positioned in front of lenses 210 and 212, respectively, as shown in FIGS. 2A, 2B, and 2C. See-through displays 202 and 204 may be attached to the head-mounted support 209 using support mounts 224 and 226, respectively. Alternatively, see-through displays 202 and 204 may be integrated partially or completely into lens elements 210 and 212, respectively.

Although this example includes a see-through display for each of the wearer's eyes, it is to be understood that a HMD might include a see-through display for only one of the wearer's eyes (either left eye 208 or right eye 206). Further, instead of having see-through displays positioned in front of lens elements 210 and 212, a lens element could itself function as a see-through display. For example, projectors located on side-arms 220 and 222 could project images onto lens elements 210 and 212, respectively. Special coatings on lens elements 210 and 212 may reflect some of the projected light, so that the projected images may be seen in combination with the real-world view through lens elements 210 and 212. Still other types of see-through displays could be included in an HMD. Alternatively, instead of a see-through display, an HMD could include scanning laser devices that interact directly with the wearer's retinas.

HMD 200 may also include various control elements, sensors, user interfaces, and communication interfaces. In the example illustrated in FIGS. 3A, 3B, and 3C, HMD 200 includes a computer 240, a touchpad 242, a microphone 244, a button 246 and a camera 232. The computer 240 may control see-through displays 202 and 204, using data from camera 232 and/or other sources to determine the virtual image that should be displayed to the wearer. Thus, HMD 200 may function as a wearable computing device. Alternatively, computer 240 could be located outside of HMD 200, for example, in a separate device that is worn or carried on the wearer of HMD 200, and may be communicatively coupled to HMD 200 through wires or through a wireless connection.

The touchpad 242, microphone 244, and button 246 may be part of a user interface through which HMD 200 receives input from the wearer. Thus, the wearer may provide input in the form of a touch interaction with touchpad 242, in the form of voice commands that are received by microphone 244, or by pressing button 246. It is to be understood, that these user interface elements are exemplary only, as an HMD may include other types of user interface elements or may lack a user interface altogether.

The camera 232 may be mounted on HMD 200 so that it is able to capture point-of-view images (either still images or video images) that substantially correspond to the real-world field of view that is observable through see-through displays 202 and 204. For example, camera 232 could be located on the center frame support 218 as shown in FIGS. 3A and 3B. Alternatively, the camera 232 may be located elsewhere on the head-mounted support 209, located separately from the HMD, or be integrated into one or both of see-through displays 202 and 204.

The camera 232 may further include a range-finder function that can determine a distance to an object, such as a target device, in its field of view. For example, camera 232 may include an ultrasonic range-finder, a laser range-finder, or an infrared range-finder. The camera 232 may further represent multiple cameras that may be integrated into the head-mounted support 209 or that may be located remote to the head-mounted support 209.

As noted above, the camera 232 may image a field of view that is the same as or similar to that of wearer's eyes 206 and 208. Furthermore, computer 240 may analyze the images obtained by camera 232, in order to identify target devices or other objects in the field of view. Computer 240 can then use this information to control see-through displays 202 and 204 so that they display context-sensitive virtual images.

For instance, if computer 240 detects a target device in an image obtained by camera 232, HMD 200 could alert the user by displaying a virtual image that is designed to draw the wearer's attention to the target device. The virtual image could move in response to the wearer's movements, e.g., head movements may result in the virtual image moving around the viewable area so as to remain in a fixed position relative to the target device. Also, the system could display instructions and introduce location and other visual cues to enhance interaction with the target device.

3. Example Methods

Figure 4:
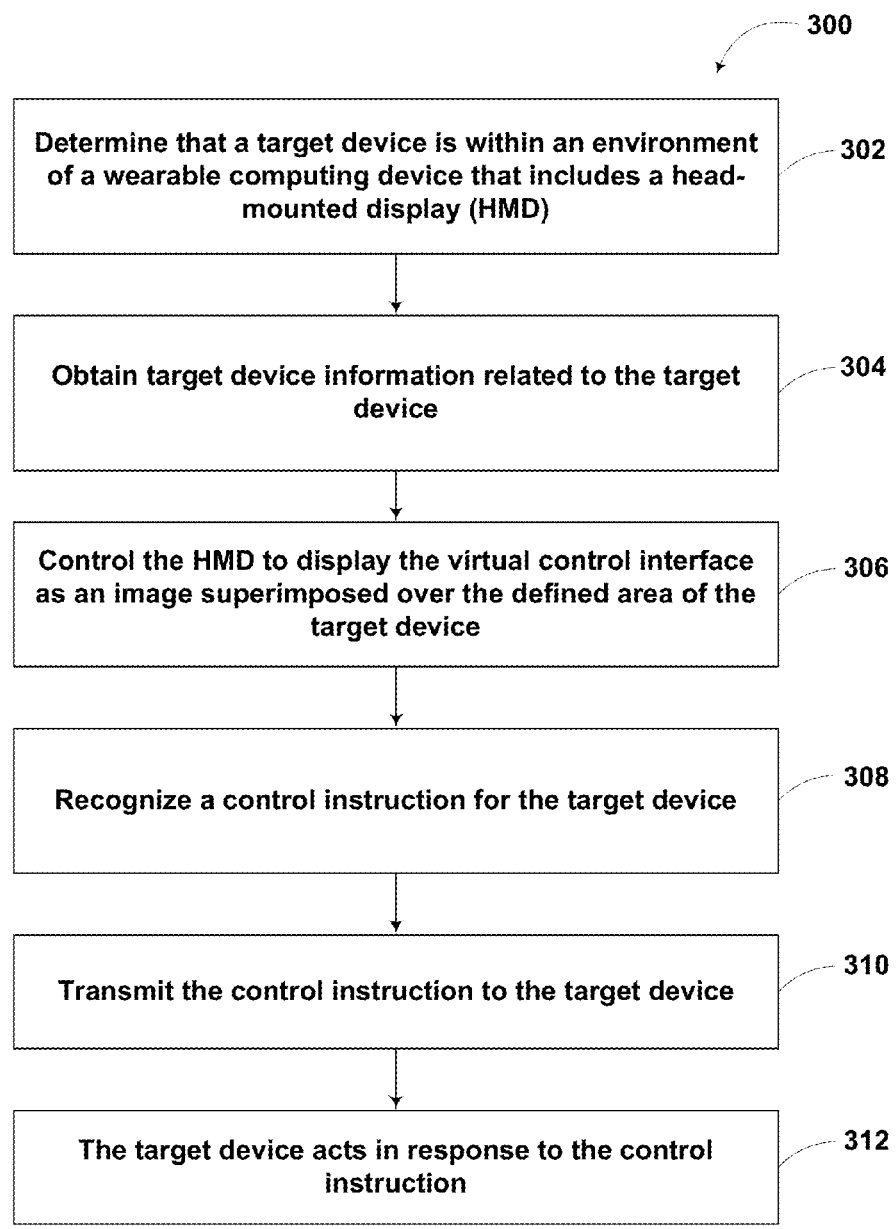
FIG. 4 is a flowchart illustrating a method, in accordance with an example embodiment.

FIG. 4 is a flowchart illustrating an example method 300 for how a wearable computing device that includes a head-mounted display (HMD) may facilitate the wearer's interaction with a target device. The wearable computing device in method 300 may correspond to wearable computing device 10 illustrated in FIG. 1, and the HMD may be configured as illustrated in FIGS. 3A, 3B, and 3C. It is to be understood, however, that the wearable computing device and/or HMD used in method 300 could be configured in other ways.

In this example, method 300 begins with a determination that a target device is within an environment of a wearable computing device that includes an HMD, as indicated by block 302. The determination could be made by the wearable computing device on its own. Alternatively, the determination could be made by the wearable computing device after sending information to and receiving a response from a server network.

The determination could be made based on information regarding the environment that is obtained by the wearable computing device. In one example, the information regarding the environment includes an image (either a still image or a video image) that is captured by a camera, for example, a camera mounted on the HMD. The wearable computing device may identify the target device from an image analysis of the image obtained by the camera. Alternatively, the wearable computing device may transmit the image to a server network, and the server network may perform the image analysis and transmit back to the wearable computing device information that identifies the target device.

The identification of the target device may include an identification of the type of target device, i.e., an identification of the target device as being a refrigerator, washing machine, copy machine, thermostat, etc. The identification of the target device may further identify the make, model, and/or brand of the target device. For example, in the case that the target device is a copy machine, the identification may specify the manufacturer and model number of the target device. An identification of a target device could also identify the target device even more specifically by including, for example, a serial number, inventory number, owner, and/or location.

Instead of or in addition to images, the wearable computing device could obtain other types of information about its environment. For example, the wearable computer device may detect a beacon that is transmitted by or on behalf of the target device. The beacon could be, for example, a radio frequency signal, an optical signal, or an ultrasonic signal. By receiving the beacon, the wearable computing device may detect the presence of the target device. In addition, the beacon may include information that identifies the target device (e.g., the type of target device, make, model, etc.). Alternatively, after detecting the presence of the target device by receiving the beacon, the wearable computing may obtain other information (such as an image of the target device or location information) from which the target device can be identified. In another example, the wearable computing device may detect and identify a target device by reading an RFID tag on the target device or by scanning a barcode or QR code on the target device. The wearable computing device may also employ a combination of techniques for target device identification. For example, after determining that a target device is in the vicinity (e.g., by analyzing images or by detecting a beacon), the wearable computing device may scan a barcode or QR code on the target device in order to identify it.

In some examples, the wearable computing device may determine that a target device is nearby based on location, such as the GPS location of the wearable computing device. For example, the location of the wearable computing device may be compared to a database of known locations of target devices. The database could be in the wearable computing device. Alternatively, the database could be in the server network. Thus, the wearable computing device may determine its location, communicate its location to the server network, and receive back identifications of one or more target devices that are in the vicinity of the wearable computing device. For example, a target device could be deemed to be in the vicinity of the wearable computing device if it is within a defined distance of the wearable computing device. The defined distance could, for example, correspond to a distance that is close enough for a typical wearer to be able to reach out and touch the target device. Alternatively, the defined distance could be a greater distance, for example, corresponding to a visual range of a typical wearer. It is to be understood, however, that a wearable computing device may also be used to control a target device that is outside of visual range.

Based on the identification of the target device, the wearable computing device may obtain target device information related to the target device, as indicated by block 304. The target device information could include various kinds of information related to the target device. For example, the target device information may include information that defines a virtual control interface for controlling the target device. The target device information may also include information that identifies a defined area of the target device on which the virtual control interface is to be provided. Further, the target device information may include information that describes a visual appearance of the target device and/or the defined area of the target device. That way, the wearable computing may be able to recognize the target device when it is in the wearer's field of view and be able to display the virtual control information as an image that is superimposed over the defined area of the target device in the wearer's field of view.

In addition to or instead of information related to a virtual control interface, the target device information may include other information related to the target device. For example, the target device information may include instructions for operating the target device, as well information defining how and when the instructions are to be displayed. The instructions could include text and/or graphics, and they could be displayed superimposed over the target device in the wearer's field of view or in a different part of the target device's field of view. The instructions could be displayed in conjunction with a virtual control interface or independently of the virtual control interface. For example, the instructions could be displayable in response to a request from the wearer or in response to a status condition of the target device. In addition to instructions for operating the target device, the target device information could include other information that may be found in a user manual for the target device, such as troubleshooting suggestions, information about obtaining repair service or customer service for the target device, warranty information, etc.

The target device information may also include information that is device specific and/or user specific. For example, the target device information may include current status information regarding the specific target device, such as whether the device is fully operational or in a fault condition. User specific information could include, for example, an access code that the wearer of the wearable computing device may use to operate the target device. User specific information could also include notes, reminders, or other information that the wearer (or someone else) has asked to be associated with the target device. The device specific and/or user specific information could be displayed in conjunction with a virtual control interface for the target device or independently of the virtual control interface.

In some examples, the wearable computing device may obtain the target device information by retrieving it from a database in the wearable computing device. In other examples, the wearable computing device may obtain the target device information by querying a server network. In particular, the server network may send the target device information (e.g., in the form of an XML file) to the wearable computing device in response to a query from the wearable computing device that identifies the target device. Alternatively, the server network may send the target device information to the wearable computing device in response to a query from the wearable computing device that includes environment information rather than an identification of a target device. For example, the wearable computing device may obtain an image of part of its environment, transmit the image to the server network, and in response receive target device information related to a target device that appears in the image. In still other examples, the wearable computing device may obtain the target device information from the target device itself. For example, after detecting and identifying a target device, the wearable computing device may send a query to the target device and receive the target device information from the target device in response to the query.

Once the wearable computing device has obtained target device information that defines a virtual control interface, the wearable computing device may control the HMD to display the virtual control information as an image superimposed over the defined area of the target device, as indicated by block 306. In addition to displaying the virtual control interface as an image, the HMD may display other images related to the target device, such as instructions or status information.

The wearable computing device may adjust the size, shape, and orientation of the displayed virtual control interface to match the appearance of the defined area from the perspective of the wearer's field of view. For example, if the defined area is rectangular, but the wearer is looking at the defined area at an angle instead of straight on, then the defined area may appear trapezoidal. The shape of the virtual control interface may then be adjusted so that it fits within the trapezoidal defined area. In addition, the size of the virtual control interface may be adjusted based on the apparent size of the defined area in the wearer's field of view, so as to be smaller when the target device is farther away and larger when the target device is closer. As the wearer moves around, the size, shape, and orientation of the displayed virtual control interface may continue to be adjusted so that it fits within the defined area as seen from the wearer's perspective. In this way, the virtual control interface may be displayed so that it appears to be on the actual surface of the target device in the defined area.

Although the virtual control interface may initially be displayed in the defined area of the target device, the wearer of the wearable computing device may be able to subsequently adjust the location of the virtual control interface. For example, the wearer may move the virtual control interface to another part of the target device. In some cases, the wearer may be able to move the virtual control interface away from the target device so that it appears as an image superimposed over another object in the field of view or so that the virtual control interface simply "hovers" in the field of view unconnected with any specific object. In other examples, the virtual control interface is "head-fixed" so that it moves with the wearer's head instead of remaining fixed to the target device or other object.

With the virtual control interface being displayed, the wearable computing device may recognize a control instruction for the target device, as indicated by block 308. The control instruction could be an instruction from the wearer of the wearable computing device to control the target device. The control instruction could be associated with a specific element of the virtual control interface. For example, the virtual control interface could include a number of virtual buttons, with each virtual button associated with a distinct control instruction. Alternatively or additionally, the virtual control interface may include a virtual touchpad, a virtual scrollbar, or other element that may be associated with multiple control instructions.

In some examples, the control instruction could be recognized from a gesture that indicates an interaction with the virtual control interface. For example, if the virtual control interface includes a virtual button and the wearer's finger moves toward or touches a location of the target device corresponding to the location of the virtual button in the virtual control interface, the wearable computing device may recognize the gesture as a control instruction associated with the virtual button. Other types of gestures could also be recognized as control instructions. For example, motions of the wearer's head may be detected using motion sensors in the HMD (e.g., sensors 28 shown in FIG. 1). An up-and-down motion of the wearer's head may be recognized as a "YES" instruction and a side-to-motion of the wearer's head may be recognized as a "NO" instruction.

Alternatively or additionally, the control instruction could be recognized from input received through a user interface of the wearable computing device. In one example, the user interface includes a touchpad (which might be mounted on the HMD). Thus, the wearable computing device might recognize a touch interaction with the touchpad as corresponding to a control instruction associated with the virtual control interface. In another example, the user interface includes a microphone. Thus, the wearable computing device might recognize a voice command as corresponding to a control instruction associated with the virtual control interface.

The wearable computing device may transmit the control instruction to the target device, as indicated by block 310. In some examples, the wearable computing device may transmit the control instruction directly to the target device, for example, using an infrared or Bluetooth link. In other examples, the wearable computing device may transmit the control instruction to the target device via a communication network, such as a wireless local area network (WLAN). In still other examples, the wearable computing device may transmit the control instruction to a server network for subsequent transmission to the target device.

The target device may then act in response to the control instruction, as indicated by block 312. For example, if the target device is a photocopier and the control instruction is a "copy" instruction, then the target device may make a photocopy in response to the control instruction.

Figure 5:
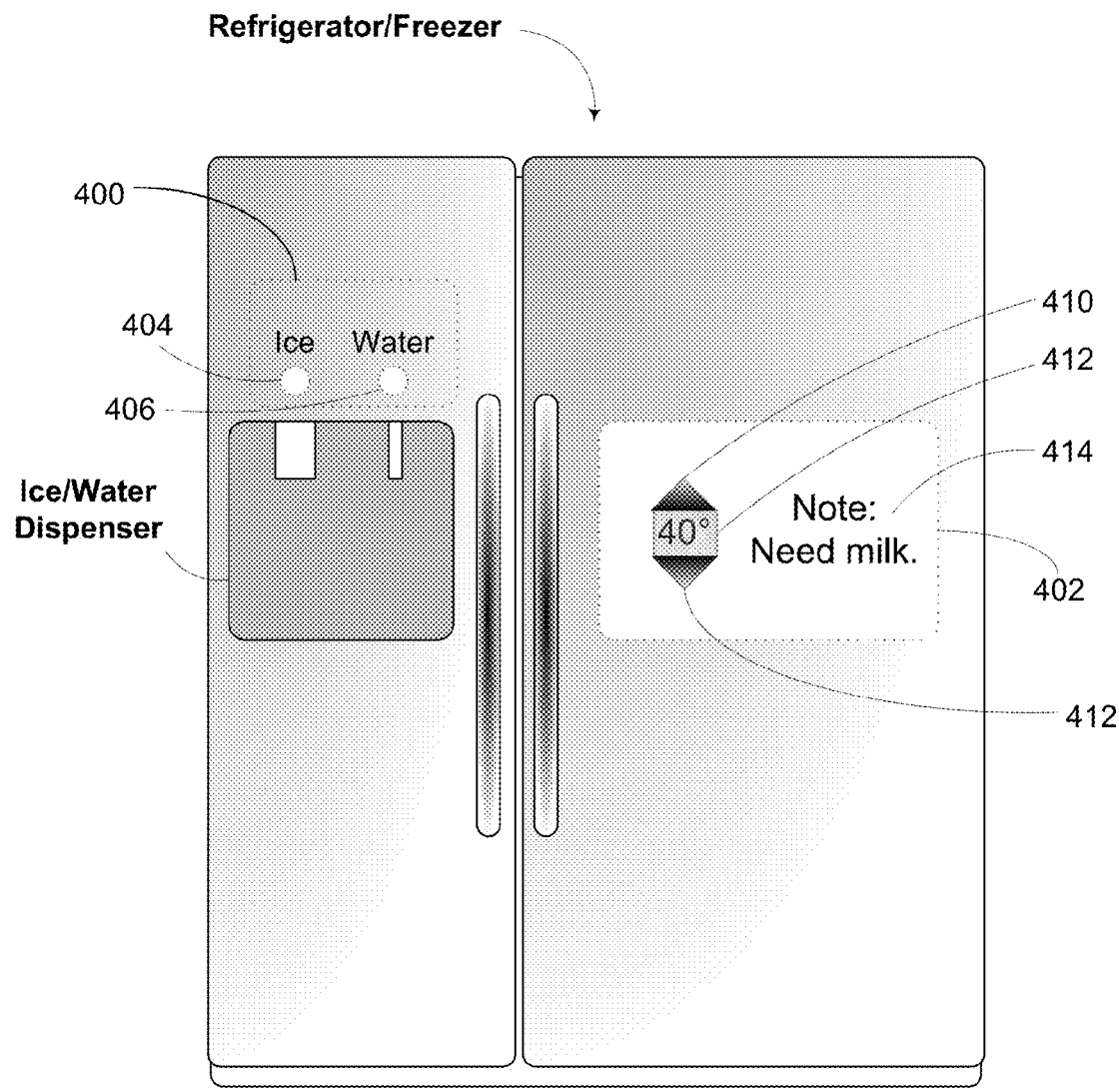
FIG. 5 is a view of a refrigerator/freezer with superimposed virtual control interfaces, in accordance with an example embodiment.

FIG. 5 illustrates an example of how virtual control interfaces may be displayed on a refrigerator/freezer. In particular, FIG. 5 shows what may be visible to a wearer of a wearable computing device with an HMD after the wearable computing device has recognized the refrigerator/freezer as a target device. In this example, a first virtual control interface 400 is displayed on the freezer door above an ice/water dispenser, and a second virtual control interface 402 is displayed on the refrigerator door.

Virtual control interface 400 may be used to control the operation of the ice/water dispenser. As shown in FIG. 5, virtual control interface 400 includes the virtual text "Ice" above a virtual button 404 that is associated with a control instruction for dispensing ice and includes the virtual text "Water" above a virtual button 406 that is associated with a control instruction for dispensing water.

The wearer of the HMD displaying virtual interface 400 may actuate virtual button 404 by a gesture, such as moving a finger toward the location on the freezer door where virtual button 404 appears. The wearable computing device may recognize the gesture as being associated with a control instruction for dispensing ice and transmit the control instruction to the refrigerator/freezer. In response, the refrigerator/freezer may control the ice/water dispenser to dispense ice. The wearer may actuate virtual button 406 in a similar manner to cause ice/water dispenser to dispense water.

In addition to, or instead of, being actuated through gestures, virtual buttons 404 and 406 could be actuated in other ways, for example, using a user interface on the wearable computing device. In one example, the wearer may be able to select one of virtual buttons 404 and 406 by a touch interaction with a touchpad, such as a swipe to the left to select virtual button 404 or a swipe to the right to select virtual button 406. Virtual control interface 400 may indicate the selected virtual button by highlighting it in some fashion, such as by an increase in brightness or by a change in color. The wearer may then be able to actuate the selected virtual button by another touch interaction, such as a tap on the touchpad.

In another example, the wearer may be able to actuate one of virtual buttons through voice buttons that the wearable computing device receives through a microphone. For example, the wearer may be able to say "Ice" to actuate virtual button 404 or say "Water" to actuate virtual button 406.

Virtual control interface 402 may be used to set the temperature of the refrigerator. In this regard, virtual control interface 402 may include a status indicator 408 that indicates the refrigerator's current set-point temperature, as well as virtual buttons 410 and 412 that are associated, respectively, with control instructions for increasing and decreasing the set-point temperature. For example, the wearer may actuate virtual button 410 to increase the set-point temperature by one degree or actuate virtual button 412 to decrease the set-point temperature by one degree.

The wearer of the HMD may be able to actuate one of virtual buttons 410 and 412 by making a gesture toward the location of the virtual button on the refrigerator door. Alternatively or additionally, the wearer may be able to actuate one of virtual buttons 410 and 412 by interacting with a user interface of the wearable computing device. For example, an upward motion on a touchpad might actuate virtual button 410 and a downward motion on a touchpad might actuate virtual button 412.

In the example illustrated in FIG. 5, virtual control interface 402 also includes a note 414 that includes the following text: "Need milk." Note 414 could be a user specific message that was established by the wearer of the wearable computing device (or by someone else) as a reminder. It is to be understood that different messages could be displayed at different times. For example, note 414 could be discontinued at some point and/or replaced by a different textual or graphical message.

Figure 6:
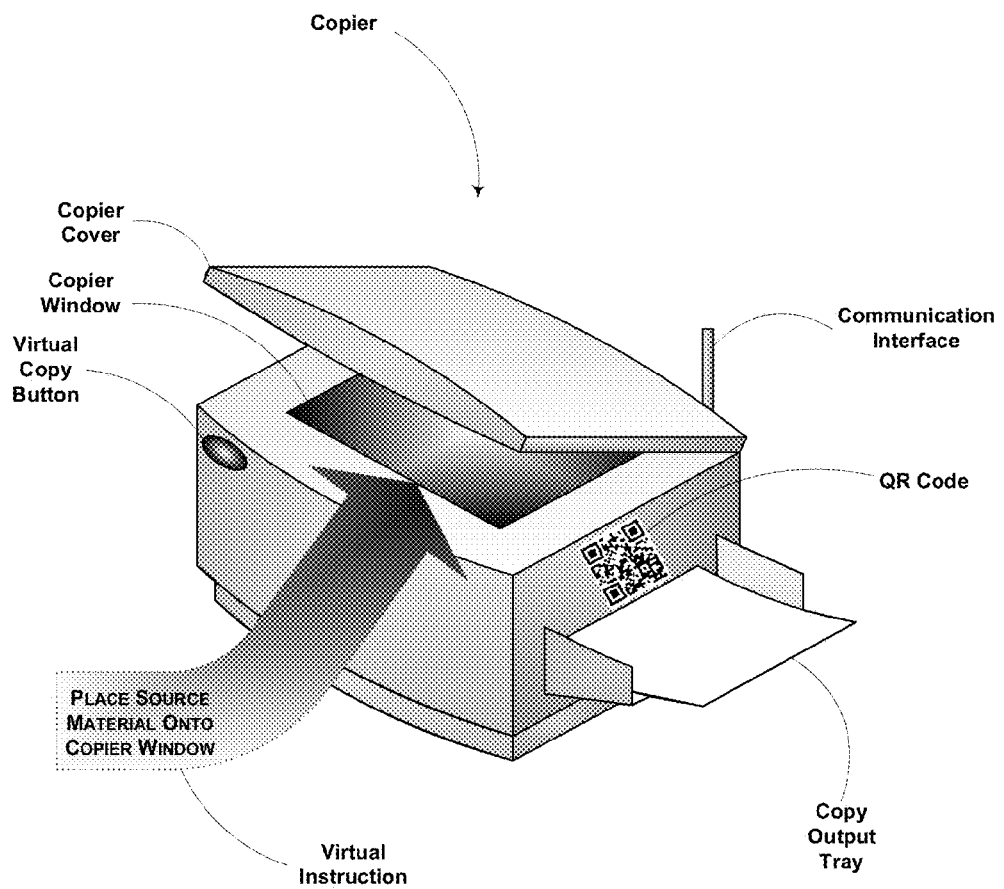
FIG. 6 is a view of a copier in a ready-to-copy state with a superimposed virtual control interface, in accordance with an example embodiment.
Figure 7:
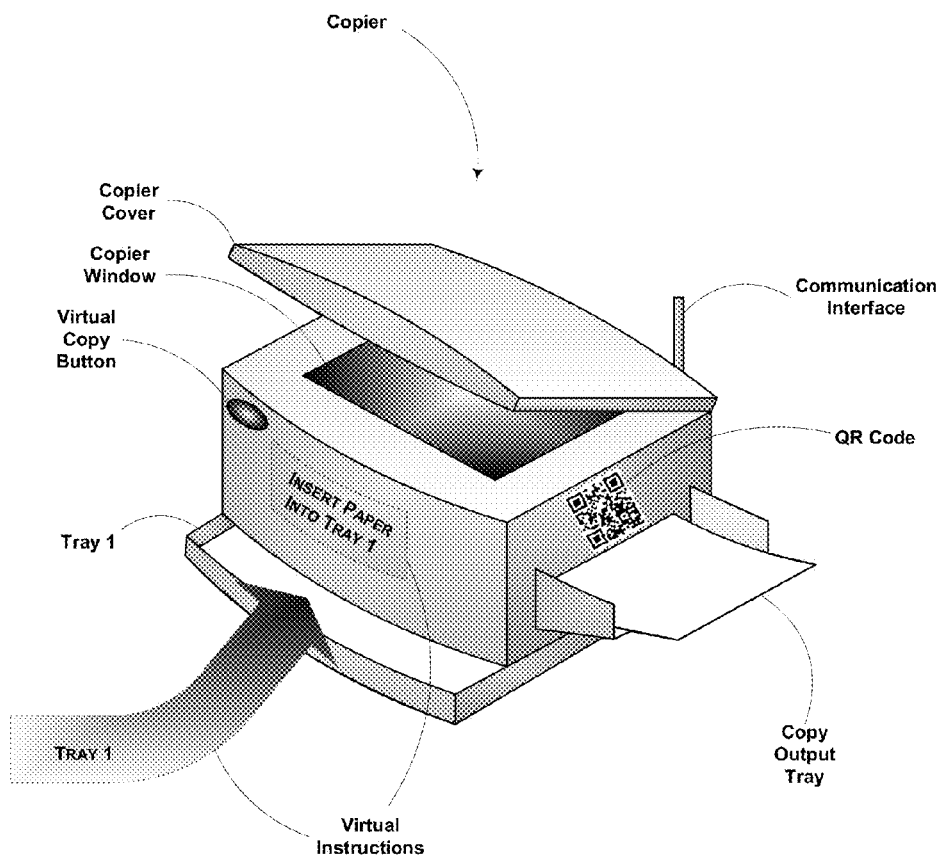
FIG. 7 is a view of a copier in an out-of-paper state with a superimposed virtual control interface, in accordance with an example embodiment.
Figure 8:
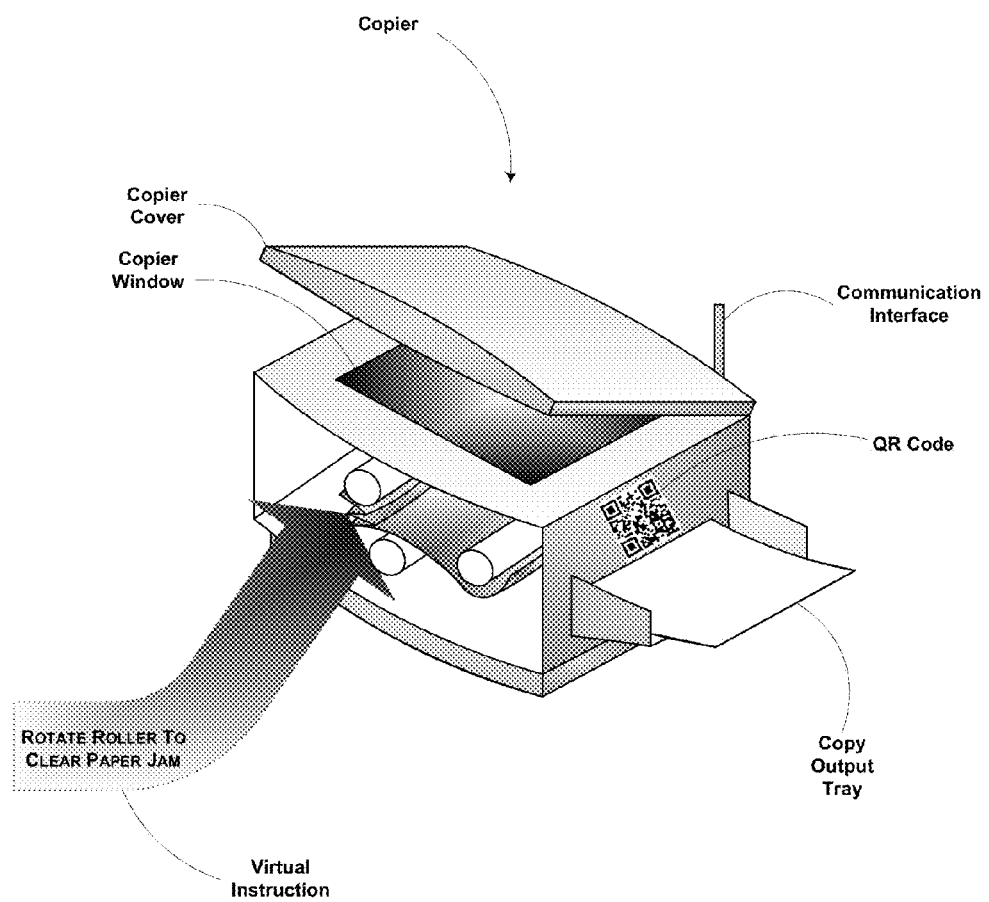
FIG. 8 is a view of a copier in a jammed state with a superimposed virtual control interface, in accordance with an example embodiment.

FIGS. 6, 7, and 8 illustrate how a virtual control interface may be provided for a copier, in accordance with the operational state of the copier. As shown in these figures, the copier includes a QR code, which a wearable computing device may use to detect and identify the copier, and a communication interface that allows for two-way communication with the wearer computing device. The communication interface could be a wireless interface, such as a WiFi or Bluetooth interface.

FIG. 6 illustrates an example in which the copier is in a ready-to-copy state, an operational state that the copier may indicate to the wearable computing device using the communication interface. In this operational state, the virtual control interface may include a virtual copy button and virtual text instruction. The virtual copy button may be actuated (for example, by a gesture or by input through a user interface of the wearable computing device) to cause the copier to make a copy. Thus, the wearable computing device may recognize an actuation of the virtual copy button as a copy instruction and communicate the copy instruction to the copier. The virtual text instruction includes the following text: "PLACE SOURCE MATERIAL ONTO COPIER WINDOW" within an arrow that indicates the copier window.

It is to be understood that the virtual control interface may include other and/or additional elements than what is shown in FIG. 6. For example, the virtual control interface may include additional virtual control buttons to select the number of copies, adjust the contrast, etc. In addition, the virtual control interface may include other types of instructions.

FIG. 7 illustrates an example in which the copier is in an out-of-paper state. When the copier is out of paper, the copier may communicate this operational state to the wearable computing device using the communication interface. In response, the wearable computing device may adjust the virtual control interface to display different virtual instructions. As shown in FIG. 7, the virtual instructions may include the following text displayed on the copier housing: "INSERT PAPER INTO TRAY 1" and the text "TRAY 1" in an arrow that indicates Tray 1.

FIG. 8 illustrates an example in which the copier is in a jammed state. When the copier is in a jammed state, the copier may communicate this operational state to the wearable computing device using the communication interface. In response the wearable computing device may adjust the virtual control interface to display one or more virtual instructions that explain how to clear the paper jam. As shown in FIG. 8, the virtual instruction includes the text: "ROTATE ROLLER TO CLEAR PAPER JAM" in an arrow that indicates the appropriate roller.

It is to be understood that the virtual control interfaces illustrated in FIGS. 6, 7, and 8 are merely examples. In other examples, the virtual control interfaces for a copier may include other and/or additional virtual control buttons, virtual instructions, or virtual status indicators. In addition, although three operational states are illustrated in FIGS. 6, 7, and 8 (ready-to-copy, out-of-paper, and jammed), it is to be understood that a wearable computing device may display virtual control interfaces for a greater or fewer number of operational states. In addition, it should be understood that the virtual control interface for a target device, such as a copier, might not be responsive to the target device's operational state at all.

Figure 9:
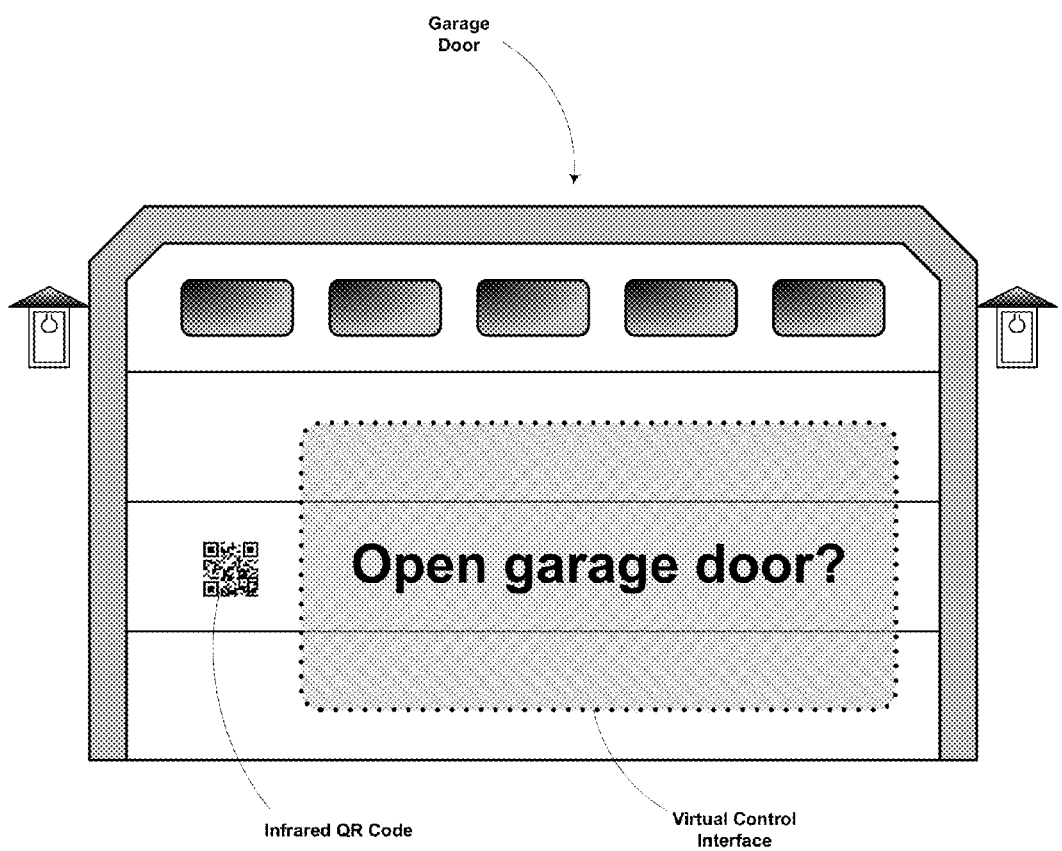
FIG. 9 is a view of a garage door in a closed state with a superimposed virtual control interface, in accordance with an example embodiment.
Figure 10:
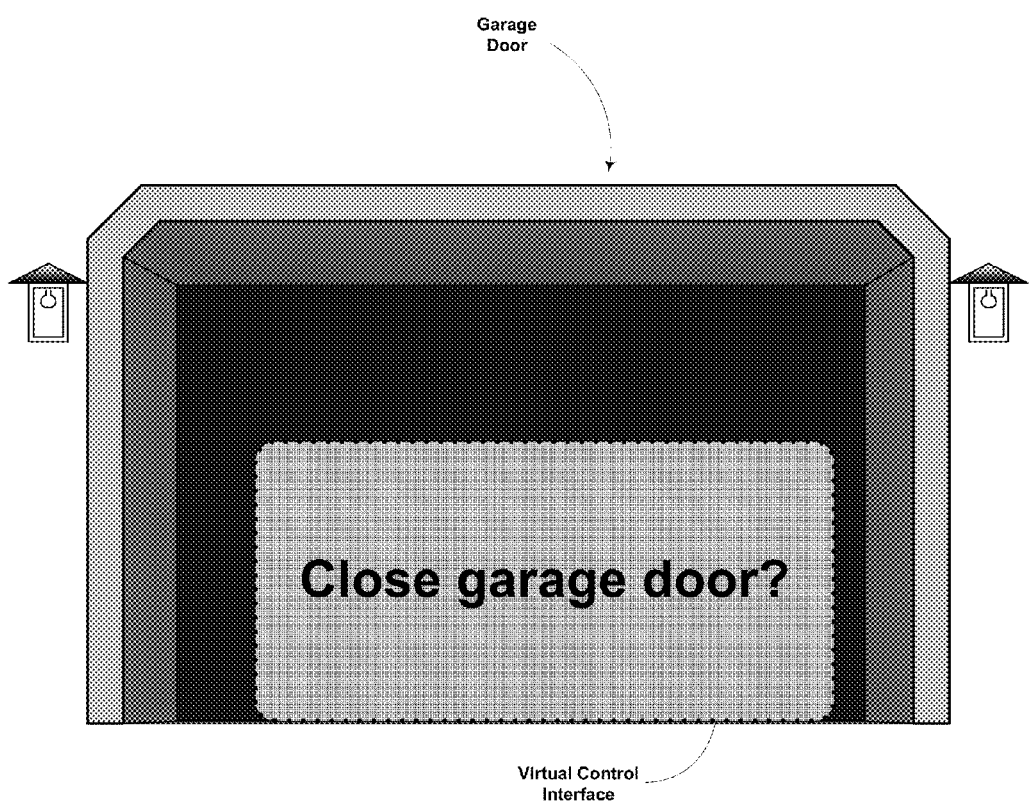
FIG. 10 is a view of a garage door in an open state with a superimposed virtual control interface, in accordance with an example embodiment.

FIGS. 9 and 10 illustrate how a virtual control interface may be provided for a garage door, in accordance with the operational state of the garage door. In this example, it is assumed that there are no dedicated physical controls available for opening the garage door. Instead, a wearable computing device may function as a remote control for the garage door.

In FIG. 9, the garage door is in a closed state. In response to identifying the garage door and determining that it is in a closed state, the wearable computing device may display a virtual control interface that is superimposed over the garage door, as illustrated in FIG. 9. The virtual control interface may include the text "Open garage door?"

The wearer of the wearable computing device may interact with the virtual control interface in various ways. For example, an up-and-down motion of the wearer's head may be interpreted as a "Yes" that causes the wearable computing device to transmit a signal (such as an RF signal) that opens the garage door. A side-to-side motion of the wearer's head may be interpreted as a "No" that causes the wearable computing device to stop displaying the virtual control interface. Instead of using head motions, the wearer may instruct the wearable computing device to open the garage door in other ways. For example, a gesture of the wearer's finger toward the virtual control interface may be interpreted as a "Yes." Alternatively, the wearer may actuate a button or interact with a touchpad on the wearable computing device to indicate a "Yes." A wearer might also be able to provide a spoken "Yes" or "No" instruction to the wearable computing device.

The wearable computing device may display the virtual control interface in response to an instruction from the wearer. For example, the wearer may instruct the wearable computing device to provide the virtual control interface as the wearer is pulling into the driveway, or even before the garage door is within the wearer's field of view. In this regard, the wearable computing device could be configured to display the virtual control interface so that it is affixed to the garage door, or the virtual control interface could be "head-fixed" so that it is displayed in the wearer's field of view regardless of whether the garage door is also in the wearer's field of view.

The wearable computing device could also display the virtual control interface automatically. For example, the garage door to the wearer's residence could be a known location that is stored in the wearable computing device. When the wearable computing device determines (e.g., using GPS) that is in the vicinity of the garage door's known location, the wearable computing device may begin scanning for a QR code associated with the garage door. Alternatively, the wearable computing device may begin scanning for the QR code after receiving a beacon signal transmitted by the garage door opening or in response to other information.

FIG. 9 illustrates an example in which an infrared QR code is on the garage door. This infrared QR code may be designed to be undetectable to the human eye (i.e., undetectable using visible light) but detectable using infrared radiation in a particular wavelength range. In this way, the wearable computing device may be able to detect the infrared QR code on the garage door even though it is not detectable to the ordinary observer. By scanning the infrared QR code, the wearable computing device may identify the garage door as a target device and determine that the garage door is in a closed state. In response, the wearable computing device may begin displaying the virtual control interface associated with the garage door in its closed state, as illustrated in FIG. 9.

FIG. 10 illustrates a virtual control interface for a garage door in an open state. In this example, the virtual control interface includes the text "Close garage door?" The wearable computing device may display the virtual control interface based on proximity to the open garage door and a determination that the garage door is in an open state. The wearable computing device may determine the open state of the garage door in various ways, for example, by analyzing an image of the open garage door, by failing to detect the garage door's infrared QR code, by receiving state information wirelessly transmitted from the garage door opener, or in other ways. The wearer may interact with the virtual control interface through, for example, head motions, other gestures, interaction with a touchpad or button on the wearable computing device, or voice commands. In response to a "Yes" instruction, the wearable computing device may transmit a signal (such as an RF signal) that closes the garage door. In response to a "No" instruction, the wearable computing device may stop displaying the virtual control interface.

4. Non-transitory Computer Readable Medium

Some or all of the functions described above and illustrated in FIGS. 4-10 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a wearable computing device, such as wearable computing device 10 illustrated in FIG. 1. Alternatively, the computing device that executes the stored instructions could be another computing device, such as a server in server network 12.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining that a controllable target device is within an environment of a wearable computing device comprising a head-mounted display (HMD), wherein the HMD provides a field of view in which at least a portion of the environment is viewable, and wherein the HMD is operable to display images superimposed over the field of view;
   obtaining target device information related to the controllable target device, wherein the target device information defines a virtual control interface for controlling the controllable target device and identifies a defined area of the controllable target device on which the virtual control interface is to be provided, wherein the target device information further includes status information related to an operational status of the controllable target device;
   controlling the HMD to display the virtual control interface as an image superimposed over the defined area of the controllable target device in the field of view and to display an indication of the operational status of the controllable target device;
   recognizing a gesture corresponding to interaction with the virtual control interface superimposed over the defined area of the controllable target device;
   recognizing a control instruction for the controllable target device based on the recognized gesture; and
   transmitting the recognized control instruction to the controllable target device.

2. The method of claim 1, wherein the wearable computing device further comprises a camera configured to obtain images from a point-of-view.

3. The method of claim 2, wherein the point-of-view of the camera substantially corresponds to the field of view provided by the HMD.

4. The method of claim 2, wherein determining that a controllable target device is within an environment of a wearable computing device comprises:
   receiving a point-of-view image obtained by the camera; and
   identifying the controllable target device in the point-of-view image.

5. The method of claim 4, wherein the point-of-view image is a video image.

6. The method of claim 1, wherein determining that a controllable target device is within an environment of a wearable computing device comprises:
   receiving a beacon from the controllable target device.

7. The method of claim 1, wherein determining that a controllable target device is within an environment of a wearable computing device comprises:
   recognizing a radio frequency identification (RFID) tag on the controllable target device.

8. The method of claim 1, wherein determining that a controllable target device is within an environment of a wearable computing device comprises:
   recognizing an optical identification on the controllable target device.

9. The method of claim 8, wherein the optical identification is a barcode or a quick response (QR) code.

10. The method of claim 1, wherein determining that a controllable target device is within an environment of a wearable computing device comprises:
    the wearable computing device obtaining environment information regarding the environment of the wearable computing device; and
    the wearable computing device identifying the controllable target device based on the environment information.

11. The method of claim 1, wherein determining that a controllable target device is within an environment of a wearable computing device comprises:
    the wearable computing device obtaining environment information regarding the environment of the wearable computing device;
    the wearable computing device transmitting the environment information to a server network; and
    the wearable computing device receiving an identification of the controllable target device from the server network.

12. The method of claim 11, wherein the environment information comprises a physical location of the wearable computing device.

13. The method of claim 1, wherein obtaining target device information related to the controllable target device comprises:
    the wearable computing device retrieving the target device information from a target device database.

14. The method of claim 1, wherein obtaining target device information related to the controllable target device comprises:
    the wearable computing device receiving the target device information from a server network.

15. The method of claim 1, wherein the defined area of the controllable target device is an external surface of the controllable target device.

16. The method of claim 15, further comprising:
determining a perspective appearance of the defined area in the field of view; and
generating the image of the virtual control interface based on the perspective appearance of the defined area in the field of view.

17. The method of claim 15, further comprising:
determining a distance from the HMD to the defined area of the controllable target device; and
generating the image of the virtual control interface based on the distance.

18. The method of claim 1, wherein transmitting the recognized control instruction to the controllable target device comprises the wireless computing device transmitting the recognized control instruction to the controllable target device via a WiFi, Bluetooth, or infrared link.

19. The method of claim 1, wherein transmitting the recognized control instruction to the controllable target device comprises the wireless computing device transmitting the recognized control instruction to a network for transmission to the controllable target device.

20. The method of claim 1, further comprising:
the HMD displaying instructions related to the controllable target device.

21. The method of claim 1, wherein the virtual control interface comprises a plurality of visual elements and each visual element is associated with a respective control instruction for the controllable target device.

22. The method of claim 21, wherein the recognized gesture corresponds to interaction with a particular visual element of the virtual control interface, and wherein the particular visual element is associated with the recognized control instruction.

23. The method of claim 1, further comprising:
receiving the status information from the controllable target device.

24. A non-transitory computer readable medium having stored therein instructions executable by a computing device to cause the computing device to perform functions comprising:
determining that a controllable target device is within a field of view provided by a see-through display controlled by the computing device;
obtaining target device information related to the controllable target device, wherein the target device information defines a virtual control interface for controlling the controllable target device and identifies a defined area of the controllable target device on which the virtual control interface is to be provided, wherein the target device information further includes status information related to an operational status of the controllable target device;
controlling the see-through display to display the virtual control interface as an image superimposed over the defined area of the controllable target device in the field of view and to display an indication of the operational status of the controllable target device;
recognizing a gesture corresponding to interaction with the virtual control interface superimposed over the defined area of the controllable target device;
recognizing a control instruction for the controllable target device based on the recognized gesture; and
transmitting the recognized control instruction to the controllable target device.

25. The non-transitory computer readable medium of claim 24, wherein the virtual control interface comprises a plurality of visual elements and each visual element is associated with a respective control instruction for the controllable target device.

26. The non-transitory computer readable medium of claim 25, wherein the recognized gesture corresponds to interaction with a particular visual element of the virtual control interface, and wherein the particular visual element is associated with the recognized control instruction.

27. The non-transitory computer readable medium of claim 24, wherein the functions further comprise:
receiving the status information from the controllable target device.

28. A wearable computing device, comprising:
a head-mounted display (HMD), wherein the HMD is configured to provide a field of view in which at least a portion of an environment of the wearable computing device is viewable, and wherein the HMD is operable to display images superimposed over the field of view; and
a controller, wherein the controller is configured to:
determine that a controllable target device is within the environment of the wearable computing device;
obtain target device information related to the controllable target device, wherein the target device information defines a virtual control interface for controlling the controllable target device and identifies a defined area of the controllable target device on which the virtual control interface is to be provided, wherein the target device information further includes status information related to an operational status of the controllable target device;
control the HMD to display the virtual control interface as an image superimposed over the defined area of the controllable target device in the field of view and to display an indication of the operational status of the controllable target device;
recognize a gesture corresponding to interaction with the virtual control interface superimposed over the defined area of the controllable target device;
recognize a control instruction for the controllable target device based on the recognized gesture; and
transmit the recognized control instruction to the controllable target device.

29. The wearable computing device of claim 28, further comprising:
a camera configured to image a portion of the environment located in front of the HMD, wherein the controller is configured to identify the controllable target device from one or more images obtained by the camera.

30. The wearable computing device of 28, further comprising:
a target device database, wherein the controller is configured to obtain the target device information from the database.

31. The wearable computing device of claim 28, further comprising:
a communication interface, wherein the controller is configured to obtain the target device information by communicating with a server network via the communication interface.

32. The wearable computing device of claim 28, further comprising:
a communication interface, wherein the controller is configured to transmit the recognized control instruction to the controllable target device via the communication interface.

33. The wearable computing device of claim 28, wherein the virtual control interface comprises a plurality of visual elements and each visual element is associated with a respective control instruction for the controllable target device.

34. The wearable computing device of claim 33, wherein the recognized gesture corresponds to interaction with a particular visual element of the virtual control interface, and wherein the particular visual element is associated with the recognized control instruction.

35. The wearable device of claim 28, wherein the controller is further configured to receive the status information from the controllable target device.

* * * * *